(12) United States Patent
Ronnau

(10) Patent No.: US 11,886,268 B2
(45) Date of Patent: Jan. 30, 2024

(54) USER PROFILE BASED ON BATTERY MEASUREMENT

(71) Applicant: Hewlett-Packard Development Company, L.P., Spring, TX (US)

(72) Inventor: Maikel Maciel Ronnau, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 30 days.

(21) Appl. No.: 17/793,281

(22) PCT Filed: Jan. 16, 2020

(86) PCT No.: PCT/US2020/013898
§ 371 (c)(1),
(2) Date: Jul. 15, 2022

(87) PCT Pub. No.: WO2021/145881
PCT Pub. Date: Jul. 22, 2021

(65) Prior Publication Data
US 2023/0043033 A1 Feb. 9, 2023

(51) Int. Cl.
G06F 1/00 (2006.01)
G06F 1/3231 (2019.01)
G06F 1/28 (2006.01)
G06F 1/3234 (2019.01)

(52) U.S. Cl.
CPC ............. G06F 1/3231 (2013.01); G06F 1/28 (2013.01); G06F 1/3234 (2013.01)

(58) Field of Classification Search
CPC ........ G06F 1/3231; G06F 1/28; G06F 1/3234; G06F 1/30; G06F 1/3212; G06F 1/3203
See application file for complete search history.

(56) References Cited

U.S. PATENT DOCUMENTS

| | | |
|---|---|---|
| 8,452,353 B2 | 5/2013 | Crawford |
| 8,594,648 B2 | 11/2013 | Musial et al. |
| 8,958,854 B1 | 2/2015 | Morley et al. |
| 9,015,513 B2 | 4/2015 | Murawski et al. |
| 9,615,333 B2 | 4/2017 | Brown et al. |
| 2013/0138983 A1 | 5/2013 | Geary |
| 2014/0082384 A1 | 3/2014 | De et al. |
| 2015/0227183 A1* | 8/2015 | Carroll ............... G06F 1/28 713/300 |

FOREIGN PATENT DOCUMENTS

| | | |
|---|---|---|
| CN | 104657520 A | 5/2015 |
| TW | 200928404 A | 7/2009 |
| TW | 201032441 A | 9/2010 |

* cited by examiner

*Primary Examiner* — Nitin C Patel
(74) *Attorney, Agent, or Firm* — Quarles & Brady LLP

(57) ABSTRACT

In some examples, an electronic device comprises a battery; a storage device storing a user profile, the user profile comprising a usage pattern of the battery; and a processor coupled to the battery and the storage device, the processor to: receive a battery measurement of the battery and operational data of a first component of the electronic device; calculate a battery consumption of the first component based on the battery measurement; compare the battery consumption to the usage pattern; update, based on the comparison, the user profile using a time series model, wherein inputs to the time series model include the battery measurement and the operational data; and adjust a battery consumption of the electronic device based on the updated user profile.

15 Claims, 11 Drawing Sheets

| User | Component | Battery Consumption | Activity | Battery Consumption | Behavior | Battery Consumption |
|---|---|---|---|---|---|---|
| 0001 | Display | 2% | Slide Show | 1% | Work | 75% |
| 0002 | Graphics Processor Unit (GPU) | 30% | Watch Movie | 50% | Home | 25% |
| ... | ... | ... | ... | ... | ... | ... |
| 9999 | Photo Edit Application | 6% | Edit Photos | 10% | Work | 80% |

USER PROFILE BASED ON BATTERY MEASUREMENT

BACKGROUND

To provide power and facilitate portability, electronic devices are often equipped with rechargeable batteries. A rechargeable battery allows an electronic device to operate in locations that do not have any available power outlets. The rechargeable battery also enables a user of the electronic device to travel from location to location without being limited by a length of a power cord. As the electronic device is utilized, a charge of the rechargeable battery dissipates. Recharging the battery often entails the electronic device remaining in a location with a power outlet for several minutes to hours.

BRIEF DESCRIPTION OF THE DRAWINGS

Various examples will be described below referring to the following figures:

FIG. 3 is a lookup table of a user profile of an electronic device, in accordance with various examples;

DETAILED DESCRIPTION

Figure 1:
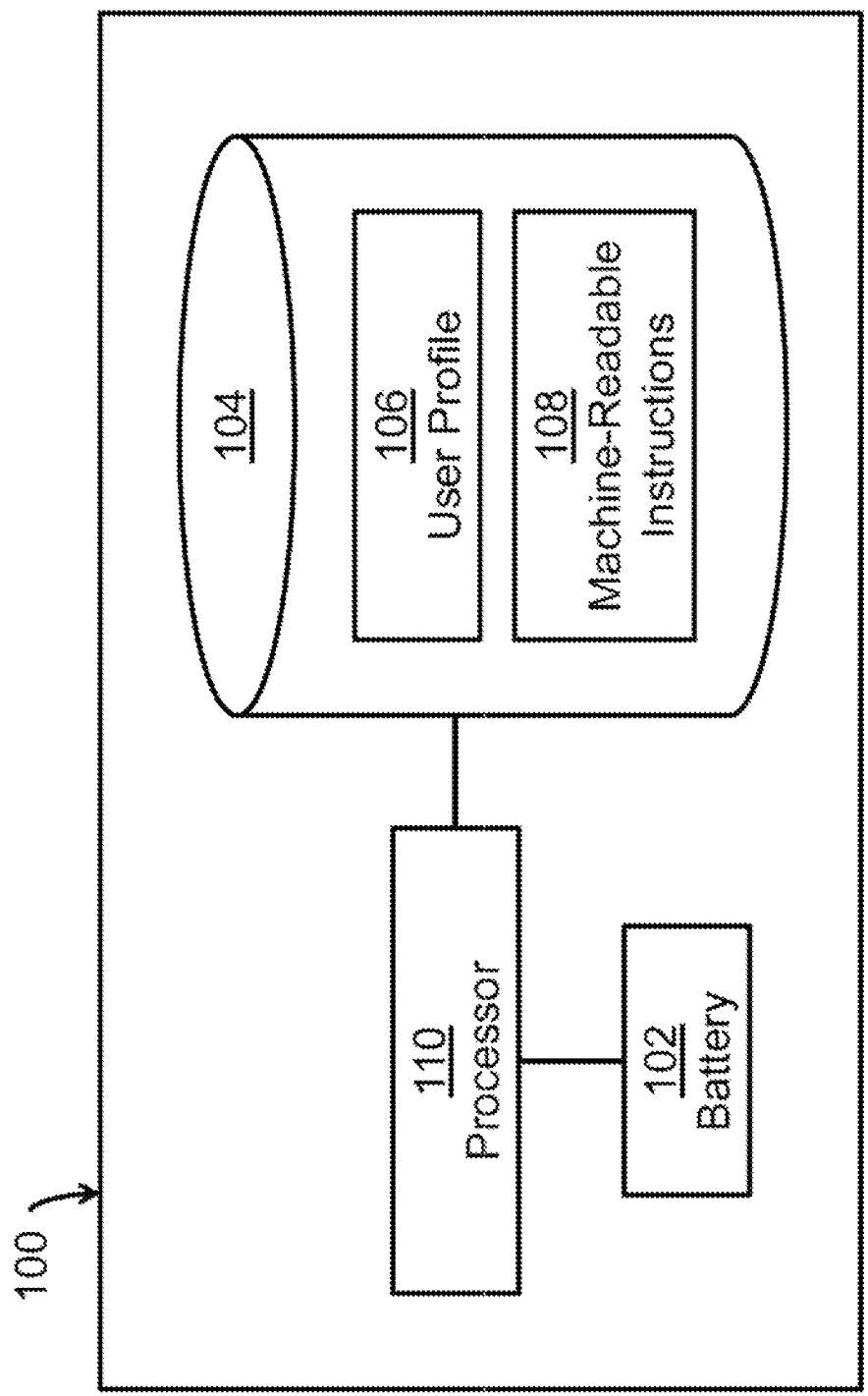
FIG. 1 is a schematic diagram of an electronic device having a battery, in accordance with various examples.

As discussed above, electronic devices (e.g., laptop computer, a notebook computer, a tablet, a smartphone, a mobile device, or any other suitable device having a battery and an ability to capture performance information) are equipped with rechargeable batteries, herein referred to as batteries, to provide power and facilitate portability. As an illustrative case, a laptop computer has a battery to allow a user to utilize the laptop device in locations where power outlets may not be available (e.g., outdoors, conference centers, shopping centers, auditoriums, cafeterias, lobbies). When an electronic device draws power from the battery, a charge of the battery dissipates.

A metric known as the "state of charge" may be used when describing batteries. The state of charge indicates the remaining amount of energy of the battery as a percentage of the maximum charge capacity. When a state of charge of the battery falls below a threshold, operations of the electronic device may be affected. For instance, an application (e.g., machine-readable instructions) may fail to execute because an energy consumption associated with the application exceeds a remaining energy associated with the state of charge. In another instance, the electronic device may shut down when the state of charge falls below the threshold. Another metric relating to batteries is known as a "maximum charge capacity." The maximum charge capacity is an amount of energy the battery holds when fully charged. The maximum charge capacity may decrease as the battery ages. As discussed below with respect to FIG. 1, the state of charge and the maximum charge capacity may be measurements taken by the electronic device.

The battery should be recharged once the charge dissipates fully or to a level that affects operations of the electronic device (e.g., to ensure operations of the electronic device are not interrupted). However, in some instances, the user may be away from a power outlet for a duration that exceeds a remaining battery life associated with the state of charge. The remaining battery life is an estimate of how long the electronic device may operate before the battery is fully discharged. The remaining battery life may be an estimate provided by the electronic device, as discussed below with respect to FIG. 1, or it may be an estimation made by the user. Due to performance configurations of the system and actions taken by the user (e.g., failing to recharge after receiving low battery warnings, continuing to utilize the electronic device when the charge dissipates below the threshold), the remaining battery life may be inaccurate, and the battery may dissipate faster than estimated. Performance configurations are settings that establish operational limits and conditions for components of the electronic device. Components of the electronic device include hardware (e.g., central processing unit (CPU), graphics processing unit (GPU), fan, input device, memory device, output device, wireless transmitters, lights) and applications (e.g., machine-readable instructions).

This disclosure describes various examples of an electronic device configured to improve the accuracy of a calculation of a remaining battery life and to increase the remaining battery life by adjusting a battery consumption of the electronic device based on a battery measurement, operational data, and a user profile. The battery consumption is a rate of battery discharge during a time period. The time period may be fixed or variable, as discussed below with respect to FIG. 1. The rate of battery discharge during the time period is determined by what components are utilized during the time period. For instance, the rate of battery discharge during a time period during which multiple applications are executing may be higher than a time period during which no user interaction with the electronic device occurs. The battery measurement is performance information about the battery during the time period. (See below with respect to FIG. 1 for a discussion of battery measurements.) Operational data is performance information about a component during the time period. (See below with respect to FIG. 2 for a discussion of operational data.) The user profile is relationship information that describes data (e.g., information about the electronic device, information about a user of the electronic device) that affects the calculation of a usage pattern of the battery. (See below with respect to FIGS. 1 through 5 for a discussion of the user profile.) The usage pattern is a model of battery consumption over multiple time periods. (See below with respect to FIG. 2 for a discussion of the usage pattern.) The electronic device utilizes a time series model to update the user profile based on the battery measurement and the operational data. The time series model determines patterns in time-based data points. (See below with respect to FIGS. 1 and 2 for a discussion of time series models.) By considering the user profile in conjunction with the battery measurement and operational data, the accuracy of the calculation of the remaining battery life may be improved and the remaining battery life may be increased by reducing battery consumption by the electronic device.

In an example in accordance with the present disclosure, an electronic device is provided. The electronic device comprises a battery; a storage device storing a user profile, the user profile comprising a usage pattern of the battery; and a processor coupled to the battery and the storage device, the processor to: receive a battery measurement of the battery and operational data of a first component of the electronic device; calculate a battery consumption of the first component based on the battery measurement; compare the battery consumption to the usage pattern; update, based on the comparison, the user profile using a time series model, wherein inputs to the time series model include the battery measurement and the operational data; and adjust a battery consumption of the electronic device based on the updated user profile.

In another example in accordance with the present disclosure, a system is provided. The system comprises a computer-readable medium coupled to a processor. The computer-readable medium is a non-transitory medium that stores machine-readable instructions which, when executed by a processor of an electronic device, cause the processor to receive operational data of an electronic device, the operational data comprising a battery measurement log and an activity log; calculate a battery consumption of an activity of the activity log based on a battery measurement of the battery measurement log; compare the battery consumption to a usage pattern of a user profile; update, based on the comparison, the user profile using a time series model, wherein inputs to the time series model include the battery consumption and the activity; and adjust a battery consumption of the electronic device based on the updated user profile.

In yet another example in accordance with the present disclosure, a method is provided. The method comprises receiving a battery measurement of a battery of an electronic device; receiving an activity of the electronic device; calculating a battery consumption of the activity based on the battery measurement; updating, based on the calculation, a user profile of the electronic device using a time series model, wherein inputs to the time series model include the battery consumption and the activity; and adjusting a battery consumption of the electronic device based on the updated user profile.

FIG. 1 is a schematic diagram of an electronic device 100 having a battery 102, in accordance with various examples. The electronic device 100 comprises the battery 102, a storage device 104, and a processor 110 coupled to the battery 102 and the storage device 104. For example, the electronic device 100 may be a laptop computer, a notebook computer, a tablet, a smartphone, a mobile device, or any other suitable device having a battery 102 and capable of capturing data about operations of the device. The processor 110 may comprise a microprocessor, a microcomputer, a microcontroller, or another suitable controller, for example. For example, the storage device 104 may include a hard drive, solid state drive (SSD), flash memory, random access memory (RAM), or other suitable memory.

The storage device 104 may include a user profile 106 and machine-readable instructions 108. As discussed above, the user profile 106 is relationship information that describes data that affects a determination of a usage pattern (e.g., information about the electronic device 100, information about a user of the electronic device 100). In some examples, the user profile 106 is implemented as a data structure storing data that affects the calculation of the usage pattern. As used herein, a data structure is an object that stores and cross-references data (e.g., a lookup table or database). As discussed below with respect to FIGS. 4 and 5, in some examples, the usage pattern of the user profile 106 is determined by a neural network. The inputs to the neural network include data that may impact a usage pattern based on sets of weighted relationships (e.g., bias layers). In another example, as discussed below with respect to FIG. 2, the usage pattern may be generated by a time series model. The machine-readable instructions 108, when executed by the processor 110, may cause the processor 110 to perform some or all of the actions attributed herein to the processor 110.

In various examples, the user profile 106 may include information about the electronic device 100 (e.g., date, time, owner, component, activity), about a user of the electronic device 100 (e.g., identifier, behavior), or a combination thereof. As discussed above, a component may be a piece of hardware or an application. The piece of hardware may be a CPU, a GPU, a fan, an input device, a memory device, an output device, wireless transmitters, or lights, for example. The input device may be a touchscreen, a keyboard, a mouse, or a card reader, for example. The output device may be a printer, a display, or a touchscreen, for example. The application may be an operating system, a hardware driver, a text editor, a spreadsheet, or a photo editor, for example. An activity of the electronic device 100 describes an operation of the electronic device 100 that utilizes multiple components (e.g., playing a slide show, editing a document, editing an image, messaging). In this disclosure, any of a variety of information about components or activities may qualify as information about the electronic device 100 with the exception of watching a movie, reading a news article, playing a game, utilizing a payment application, and operating the electronic device 100 in airplane mode, which may be excluded in some examples, and included in other examples. A user behavior describes an activity or a set of activities the user engages in on a routine basis (e.g., attend meeting daily, watch movie daily, edit photos weekly, attend conference monthly). In this disclosure, any of a variety of information about user behavior may qualify as information about the user with the exception of a daily work schedule, which may be excluded in some examples, and included in other examples.

In some examples, the user profile 106 may be installed on the storage device 104 during manufacture of the electronic device 100. In various examples. an owner of the electronic device 100 may provide the user profile 106. In other examples, the user profile 106, comprising information about the electronic device 100, may be installed at manufacture and updated with information about a user, or the electronic device 100 as the processor 110 learns information about the electronic device 100 or the user. In yet other examples, the user profile 106 may be learned by the processor 110.

In some examples, the electronic device 100 may be shared among multiple users. For example, the electronic device 100 may be a laptop shared among students at a school. The electronic device 100 may be a tablet shared among medical assistants in a physician's office, in another example. In yet another example, the electronic device 100 may be a point-of-sale unit in a retail establishment. A user of the multiple users may have a user profile 106. The user profile 106 of a user of the multiple users may include a schedule that includes when the user has access to the electronic device 100, for example. In another example, the user profile 106 of a user of the multiple users may include a list of applications installed on the electronic device 100 to which the user has access rights. In yet another example, the user profile 106 of a user of the multiple users may include a list of network connections to which the user connects.

In various examples, the machine-readable instructions 108 may cause the processor 110 to receive a battery measurement of the battery 102. For example, the battery measurement may indicate a maximum charge capacity, a state of charge, a maximum voltage, a voltage state, a consumption rate, an error status, or some combination thereof. As discussed above, the maximum charge capacity is the amount of energy stored in a fully charged battery 102. As discussed above, the state of charge is the remaining amount of energy at a measurement time as a percentage of the maximum charge capacity. The maximum voltage is the voltage of the fully charged battery 102. The voltage state is a voltage at a measurement time. The consumption rate is a battery consumption at a measurement time. The error status is information about the overall health and life of the battery 102. For example, if a cell of the battery 102 falls below a threshold percentage of the maximum capacity, the error status may indicate the battery should be replaced.

In some examples, the machine-readable instructions 108 may cause the processor 110 to calculate a battery consumption of the electronic device 100 utilizing the battery measurement. For example, the processor 110 may receive a consumption rate and determine the consumption rate is the battery consumption of the electronic device 100. In other examples, the processor 110 may determine the battery consumption utilizing the battery measurement and a previous battery measurement. The previous battery measurement is a battery measurement captured during a time period preceding a current time period. The current time period is a time period associated with the battery measurement. In some examples, the previous battery measurement may be stored on the storage device 104. For example, the previous battery measurement may be stored as data of the user profile 106.

In some examples, the previous battery measurements are data points of a time series model. As discussed above, time series models utilize time-based data points to determine patterns in the data. A sampling rate determines when the data points are collected. The sampling rate may be at equally spaced time intervals (e.g., every minute, every fifteen minutes, hourly). For example, when the sampling rate is at fifteen minute intervals, a first time period may equal a first fifteen minutes of operation; a second time period may equal a second fifteen minutes of operation; and an nth time period may equal an nth fifteen minutes of operation. When the time period is equal to the time interval of the sampling rate, the time period may be said to be fixed. In other examples, the processor 110 may determine a pattern in the data, as discussed below with respect to FIG. 2, and a time period may be said to be variable when equal to a duration of a portion of the pattern. For example, the pattern may comprise a first duration during which the data points indicate a steady increase in battery consumption; a second, shorter duration during which the data points indicate a steady battery consumption; and a third, and longest, duration during which the data points indicate sporadic battery consumption. The time period varies depending upon which duration is utilized.

The manner in which the battery consumption is calculated may depend on which battery measurement is received. For example, the processor 110 may receive a state of charge as the battery measurement. The processor 110 may retrieve from the storage device 104 a previous state of charge and subtract the state of charge to determine the battery consumption associated with a time period of the battery measurement. The previous state of charge may be the maximum charge capacity of the battery 102, for example. In another example, the processor 110 may receive a voltage state and compare the voltage state to a voltage dissipation curve to determine a state of charge of the battery 102. The voltage dissipation curve is an example of a time series model that models a consumption rate based on the voltage state. The voltage dissipation curve encompasses a time period from the battery 102 having a full charge (e.g., maximum voltage) to the battery 102 being fully dissipated (e.g., having a charge that is substantially equal to zero).

For example, a y-axis of the curve indicates a voltage of the battery 102 and an x-axis of the curve indicates a percent of charge capacity that has been discharged. The curve may be provided by a manufacturer of the battery 102 and installed as part of the user profile 106 on the storage device 104 during manufacture of the electronic device 100, for example. The processor 110 may determine a point on the curve having a voltage value substantially equal to the voltage state. To determine a percent of capacity discharged, the processor 110 may determine a value on the x-axis that corresponds to the point on the curve. For example, the processor 110 may determine the battery consumption equals the value on the x-axis that corresponds to the point on the curve. In another example, the processor 110 may calculate the battery consumption by subtracting a percent of capacity discharged associated with a previous voltage state from the percent of capacity discharged associated with the voltage state. In some examples, as the battery 102 ages, and a maximum voltage decreases, the processor 110 may determine a new voltage dissipation curve and update the user profile 106 with the new voltage dissipation curve, as discussed below with respect to FIG. 2.

In various examples, where the battery measurement is greater than the previous battery measurement, the resulting battery consumption calculation may be zero or negative, indicating the battery 102 was charged or replaced. For example, if the state of charge is greater than a previous state of charge, then the processor 110 may determine the battery 102 was charged. In another example, if the maximum charge capacity is greater than a previous maximum charge capacity, then the processor 110 may determine the battery 102 was replaced. The processor 110 may update the user profile 106 with the information associated with the charging or replacement (e.g., the increase in charge capacity, a time period during which the electronic device 100 was charged or replaced).

By considering the additional data of the previous battery measurement, the processor 110 may improve the accuracy of the calculation of the battery consumption. In some examples, the processor 110 may utilize the battery consumption to predict a rate of drain of the battery 102. In various examples, the processor 110 may determine the rate of drain equals a ratio of the battery consumption to a time period associated with the battery measurement utilized to calculate the battery consumption. For example, the processor 110 may receive a consumption rate of 2% and having a sample rate of 10 minutes. In an example where a battery measurement of the previous ten-minute time period indicates the battery 102 had a maximum charge capacity, the processor 110 may determine the battery consumption equals the 2% consumption rate. The processor 110 may determine the rate of drain equals 2% per 10 minutes, for example.

In various examples, the processor 110 may calculate a remaining battery life based on the rate of drain. In the example where the battery measurement of the previous ten-minute time period indicates the battery 102 had a maximum charge capacity, the processor 110 may predict the remaining battery life by dividing 100% (e.g., indicating the maximum charge capacity) by 2% to determine a multiplier of 50. The processor 110 may multiply the multiplier by the time period associated with the battery measurement to obtain a total operating time. Continuing the previous example where the battery 102 has a maximum charge in the previous time period, the processor 110 multiplies 50 by 10 to determine at a rate of drain equal to 2% per 10 minutes, the electronic device 100 may have a total operating time of 500 minutes. In some examples, the processor 110 calculates the remaining battery life by subtracting the time period associated with the battery measurement utilized to calculate the battery consumption from the total operating time. Continuing the previous example where the battery 102 has a maximum charge capacity in the previous time period, the processor 110 subtracts 10 minutes (e.g., time period of the 2% consumption rate) from 500 minutes to determine a remaining battery life of 490 minutes. In another example, the processor 110 may calculate the remaining battery life by subtracting the time periods associated with the battery measurement and preceding time periods, stopping when a preceding time period indicates the battery 102 had a maximum charge capacity or was charged or replaced. By utilizing the additional data of the previous battery measurement, the processor 110 may improve the accuracy of the remaining battery life.

Figure 2:
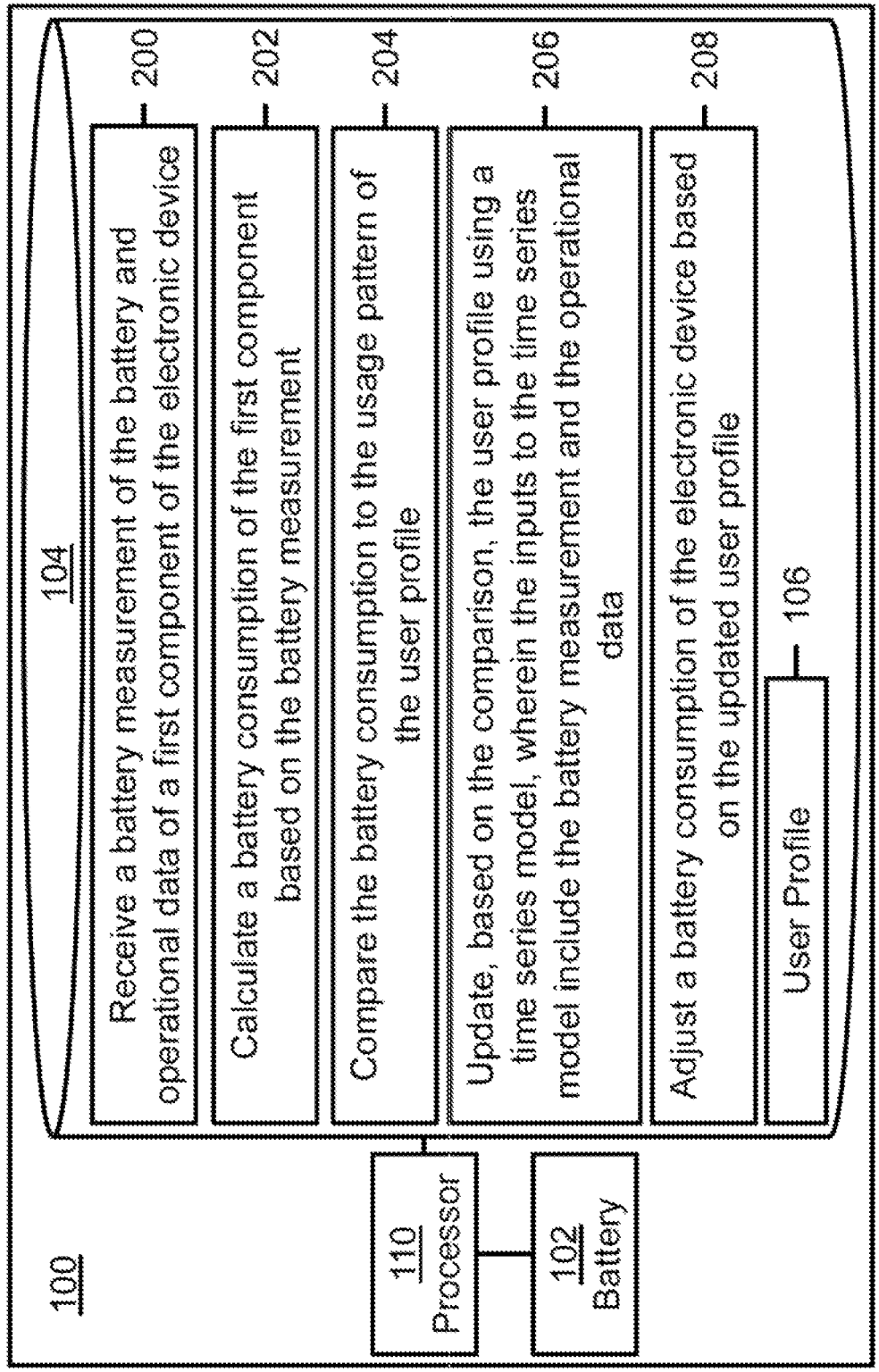
FIG. 2 is a schematic diagram of an electronic device having a battery, in accordance with various examples.

FIG. 2 is a schematic diagram of the electronic device 100 having the battery 102, in accordance with various examples. As discussed above with respect to FIG. 1, the electronic device 100 comprises the battery 102, the storage device 104, and the processor 110 coupled to the battery 102 and the storage device 104. The storage device 104 may store the user profile 106 and machine-readable instructions 200, 202, 204, 206, and 208. The machine-readable instructions 200, 202, 204, 206, 208 may be the machine-readable instructions 108, for example. The machine-readable instructions 200, 202, 204, 206, 208 may be for execution by the processor 110.

Execution of the machine-readable instructions 200, 202, 204, 206, 208 may cause the processor 110 to calculate a battery consumption of a first component, update the user profile 106 based on the battery consumption, and adjust a battery consumption of the electronic device 100 based on the updated user profile 106. Execution of instruction 200 may cause the processor 110 to receive a battery measurement of the battery 102 and operational data of the first component of the electronic device 100. Execution of instruction 202 may cause the processor 110 to calculate a battery consumption of the first component based on the battery measurement. Execution of instruction 204 may cause the processor 110 to compare the battery consumption to the usage pattern of the user profile 106. Execution of instruction 206 may cause the processor 110 to update, based on the comparison, the user profile 106 using a time series model, wherein the inputs to the time series model include the battery measurement and the operational data. Execution of instruction 208 may cause the processor 110 to adjust a battery consumption of the electronic device 100 based on the updated user profile 106.

In various examples, the processor 110 receives a battery measurement of the battery 102 and operational data of a first component. As discussed above with respect to FIG. 1, the battery measurement may be a maximum charge capacity, a state of charge, a maximum voltage, a voltage state, a consumption rate, an error status, or some combination thereof, for example. As discussed above, operational data is performance information about the state of a component. The operational data may include an identifier, a measurement, a description, an error status, or a combination thereof, for example. For example, the processor 110 may receive operational data that includes an identifier for a GPU and a usage rate (e.g., measurement) of the GPU. The usage rate may be a percentage of the total battery usage for a time period associated with the operational data, for example.

In some examples, the processor 110 may utilize the battery measurement to calculate a battery consumption for the component identified by the operational data. Continuing the previous example, the processor 110 may receive a consumption rate as the battery measurement and the usage rate of the GPU as the operational data. The processor 110 may determine the battery consumption for the GPU is the consumption rate, for example. In another example, the processor 110 may determine the battery consumption for the GPU by determining a percentage of the consumption rate based on the usage rate. For example, the processor 110 may receive a consumption rate of 2%, an identifier for the GPU, and a usage rate of 28%. The processor 110 may determine the battery consumption for the electronic device 100 is the 2% consumption rate and that the battery consumption for the GPU is 28% of 2%, or 0.56%, for example.

As discussed above with respect to FIG. 1, a previous battery measurement may be stored on the storage device 104. For example, the previous battery measurement may be stored as data of the user profile 106 stored on the storage device 104. In other examples, previous operational data may be stored on the storage device 104. Previous operational data is operational data captured during a time period preceding a time period associated with the operational data received by the processor 110. For example, the previous operational data may be stored as data of the user profile 106. In various examples, the processor 110 may utilize the previous operational data of the user profile 106 in determining the battery consumption. For example, the processor 110 may receive a battery measurement and operational data. The processor 110 may utilize the previous operational data of the user profile 106 to determine that since the time period preceding the time period associated with the operational data received by the processor 110, an additional application has been executed. The processor 110 may calculate the battery consumption for the additional application by utilizing a previous battery measurement associated with the previous time period and stored as data of the user profile 106, as discussed above with respect to FIG. 1.

As discussed above with respect to FIG. 1, in some examples, the battery consumption may indicate the battery 102 has been recharged or replaced. In various examples, the processor 110 may retrieve from the user profile 106 a usage pattern to determine a battery consumption of the first component. As discussed above with respect to FIG. 1, the usage pattern is a battery consumption over multiple time periods. The user profile may include a usage pattern for a component, an activity, a user behavior, the battery 102, the electronic device 100, or some combination thereof, for example. As discussed above with respect to FIG. 1, the usage pattern may be determined by a time series model. In some examples, the inputs of the time series model may be the battery measurement, the operational data, or some combination thereof. As discussed above with respect to FIG. 1, the sampling rate determines when data points are collected. In various examples, the sampling rate may be different for the battery measurement and the operational data. For example, battery measurements may be sampled every few seconds while operational data may be collected every minute. In another example, operational data of a first component may be sampled at a different rate than operational data of a second component. In other examples, the processor 110 may adjust the sampling rate of the battery measurement, the operational data, or some combination thereof. For example, if a user executes an application, the processor 110 may increase the sampling rate of operational data of the application to equal a sampling rate of the battery measurement. In another example, if a user closes an application, the processor 110 may decrease the sampling rate of the battery measurement and the operational data. By decreasing the sampling rate, the processor 110 may increase the remaining battery life by reducing the battery consumption of an activity (e.g., sampling data) of the electronic device 100.

In some examples, the inputs to the time series model may be calculated battery consumptions and the time periods associated with the calculated battery consumptions. For example, the inputs to the time series model for a component may be battery consumptions calculated by the processor 110 for the component and the corresponding time periods. In another example, the inputs to the time series model for an activity may be battery consumptions calculated by the processor 110 for the activity and the corresponding time periods. In yet another example, the inputs to the time series model for a user behavior may be battery consumptions calculated by the processor 110 for the user behavior and the corresponding time periods.

In various examples, the processor 110 may determine a usage pattern by plotting the battery consumptions on a y-axis and the corresponding time periods on an x-axis. In some examples, the processor 110 may determine a best-fit curve. For example, as discussed above with respect to FIG. 1, a voltage dissipation curve is an example of a best-fit curve that models a consumption rate of a battery 102 based on the voltage state. The voltage dissipation curve may be said to be a usage pattern of the battery 102 during a time period when the battery 102 has a full charge (e.g., maximum voltage) to when the battery 102 is fully dissipated (e.g., having a charge that is substantially equal to zero). As discussed above with respect to FIG. 1, in various examples, as the battery 102 ages, the maximum voltage decreases and the processor 110 may determine a new voltage dissipation curve by utilizing a time series model to determine a new best-fit curve that models the consumption rate of the battery 102.

In other examples, the processor 110 may determine the usage pattern comprises a range of battery consumptions associated with a time period. For example, the processor 110 may determine four battery consumptions 1%, 10%, 11%, and 10.2% for a component occur during a same two-hour period over a course of days. The processor 110 may determine the 1% battery consumption is an outlier and that the pattern of battery consumption for the two-hour period is 10-11%, for example. In another example, the processor 110 may determine the 1% battery consumption establishes a separate pattern of the usage pattern. For example, the 1% battery consumption may occur on a Sunday while the 10-11% battery consumptions may occur Monday through Wednesday. The processor 110 may determine a usage pattern of 1% for weekends (e.g., Saturday and Sunday) and a usage pattern of 10-11% for weekdays (e.g., Monday through Friday), for example.

In various examples, to determine the battery consumption of a component based on the usage pattern of the component, the processor 110 may compare a time period of the usage pattern to a time period of the battery measurement, the operational data, or some combination thereof, for example. A time period of the usage pattern is a period of time during which a pattern remains consistent. Consistent may indicate a value of the pattern remains substantially the same, may indicate a value of the pattern increases or decreases at a substantially same rate, or may indicate a period of instability in an otherwise consistent usage pattern.

Figure 11:
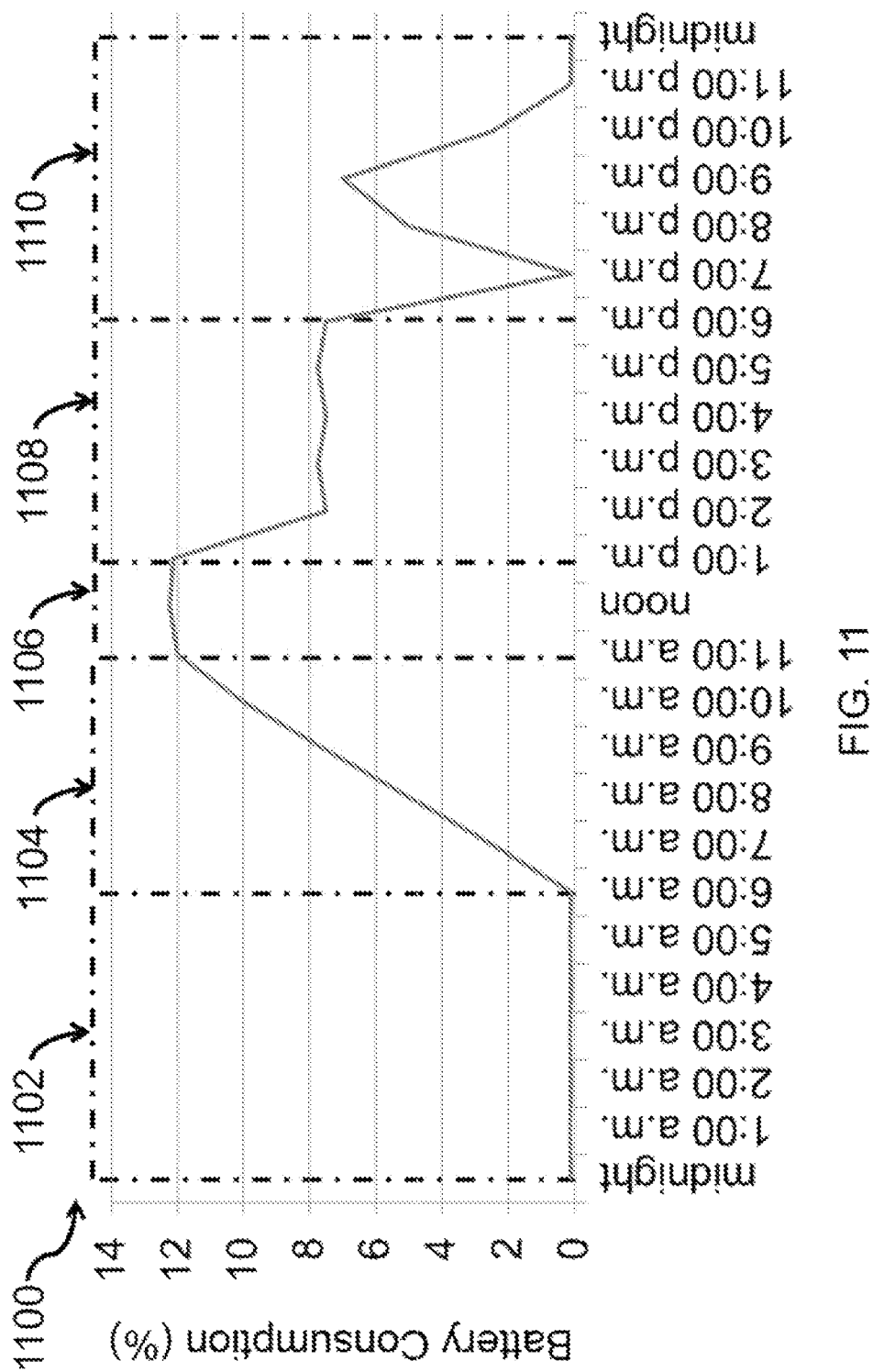
FIG. 11 is a timing diagram of a usage pattern of a user profile.

Turning ahead for a moment to FIG. 11, a timing diagram 1100 of a usage pattern of a user profile is depicted, in accordance with various examples. The user profile may be the user profile 106, for example. The x-axis indicates a time period comprising clock times of a day. The y-axis indicates a percentage of battery consumption. The usage pattern 1100 comprises time periods 1102, 1104, 1106, 1108, and 1110. The time periods 1102, 1104, 1106, 1108, 1110 correspond to a duration for which a pattern of the usage pattern 1100 remains consistent. For example, the percentage of battery remains substantially the same for first time period 1102 from midnight to 6:00 a.m.; increases at a substantially constant rate for a second time period 1104 from 6:00 a.m. until 11:00 a.m.; remains substantially the same for a third time period 1106 from 11:00 a.m. until 1:00 p.m.; drops to a lower and substantially same value for a fourth time period 1108 from 1:00 p.m. until 6:00 p.m.; and is unpredictable for a fifth time period 1110 from 6:00 p.m. until midnight.

Turning now to FIG. 2, the processor 110 may determine a time period of a battery measurement and operational data of a component is 3:00 p.m. to 3:10 p.m., for example. Utilizing the timing diagram 1100, the processor 110 may determine the battery consumption of the first component equals the battery consumption of the usage pattern 1100 for the fourth time period 1108.

In some examples, the processor 110 may retrieve from the user profile 106 a usage pattern for comparing to the battery consumption. The processor 110 may determine if the calculated battery consumption fits within the usage pattern. For example, when the usage pattern is a best-fit curve, the processor 110 may determine if the battery consumption is substantially equal to a value on the best-fit curve during an equivalent time period. In another example, when the usage pattern comprises a range of values for a time period, the processor 110 may determine if the battery consumption fits within the range during the equivalent time period.

In various examples, the processor 110 may update the user profile 106 based on the comparison of the usage pattern to the battery consumption. For example, the comparison may reveal a separate usage pattern is emerging, as discussed in the example above in which the 1% battery consumption occurred on a Sunday while the 10-11% battery consumptions occurred Monday through Wednesday. As discussed above, the processor 110 may utilize a time series model to update the user profile. As discussed below with respect to FIGS. 4 and 5, in some examples, the processor 110 may utilize machine learning techniques such as Long Short-Term Memory (or other time series modeling techniques) to update the usage pattern of the user profile 106. The inputs to the time series model may include the battery consumption, the battery measurement, the operational data, or some combination thereof, for example.

In some examples, the processor 110 may adjust a battery consumption of the electronic device 100 based on the updated user profile 106. For example, the processor 110 may determine a new usage pattern based on the updated user profile 106. In various examples, the processor 110 may calculate the remaining battery life based on the new usage pattern. The processor 110 may determine where the battery consumption fits in the new usage pattern. For example, the new usage pattern may indicate a first time period from midnight to 8:00 a.m. with little to no battery consumption; a second time period from 8:00 a.m. until 10:00 a.m. with a low, but steady battery consumption; a third time period from 10:00 a.m. until noon with a high battery consumption; a fourth time period from noon until 1:00 p.m. with little to no battery consumption; a fifth time period from 1:00 p.m. until 6:00 p.m. with a low, but steady battery consumption; and a sixth time period from 6:00 p.m. until midnight with little to no battery consumption. The processor 110 may determine the battery consumption occurs in the second time period of the new usage pattern. The processor 110 may estimate the remaining battery life based on the new usage pattern. For example, the processor 110 may utilize a step function. The processor 110 may calculate a rate of drain for each time period and sum the results to obtain a total drain on the battery based on the usage pattern. The processor 110 may subtract the total drain from the state of charge associated with the time period of the battery consumption to determine during what time period of the new usage pattern the battery 102 fully depletes.

In various examples, the processor 110 may determine the remaining battery life is sufficient to provide for the demands of the new usage pattern. In other examples, the processor 110 may utilize the updated user profile 106 to determine a component, an activity, a user behavior, or some combination thereof, that is not utilized during the remaining battery life. The processor 110 may cause a power supply to the component, a power supply to a component or to multiple components associated with the activity or the user behavior, or some combination thereof, to be adjusted. Adjusting the power supply to the component or components adjusts the battery consumption of the electronic device 100. Continuing the previous example, the processor 110 may determine the card reader is not utilized during the third through sixth time periods and cause the power supply to the card reader to be reduced. In some examples, the processor 110 may cause a display to show a prompt to the user requesting permission for the processor 110 to adjust the power supply to the component before causing the power supply to the component to be adjusted. In another example, the processor 110 may cause a display to show a prompt to the user requesting the user to select which actions the processor 110 may perform automatically, without requesting user permission. By utilizing the user profile 106, the processor 110 may improve the accuracy of the remaining battery life and adjust the battery consumption of the electronic device 100 to extend the remaining battery life.

In some examples, such as when the remaining battery life falls below a threshold, the processor 110 may cause a display to show a prompt to the user requesting the user recharge the electronic device 100. The threshold may be set by a user utilizing a power management system of the electronic device 100, for example. In various examples, the processor 110 may cause a display to show a prompt to the user to change a setting of the power management system to adjust the threshold. In other examples, the processor 110 may determine the remaining battery life is not sufficient to ensure operations associated with a component, an activity, or a user behavior of the updated user profile 106 are not interrupted. The processor 110 may calculate a recommended time period to recharge the battery 102 so that operations associated with a usage pattern are not interrupted. In yet other examples, the processor 110 may calculate a predicted battery consumption of a component, activity, or user behavior based on information in a calendar application. The processor 110 may determine the remaining battery life is not sufficient to ensure operations during the predicted battery consumption. The processor 110 may cause a display to show a prompt to the user to recharge the battery 102.

FIG. 3 is a lookup table 300 of user profiles of electronic device 100, in accordance with various examples. As discussed above with respect to FIG. 1, multiple users may share the electronic device 100. A user profile of the lookup table 300 may be the user profile 106, for example. The lookup table 300 of user profiles may be part of a data structure or neural network stored in memory that is part of main memory or long-term memory of the electronic device 100, such as SSD, RAM, or flash memory. For example, the lookup table 300 of user profiles may be part of the neural network discussed below with respect to FIGS. 4 and 5. The user profiles may be stored on the storage device 104, for example. The lookup table 300 of user profiles may comprise information about the electronic device 100 and users, as discussed above with respect to FIG. 1.

In the lookup table 300 of user profiles, a user is associated with the utilization of a component and an activity of the electronic device 100 and has a behavior. Each component, activity, and user behavior is associated with a battery consumption. For example, in the lookup table 300, a first user 0001 is associated with the utilization of a display having a battery consumption of 2%, an activity of "Slide Show" having a battery consumption of 1%, and a user behavior of "Work" having a battery consumption of 75%; a second user 0002 is associated with the utilization of a GPU having a battery consumption of 30%, an activity of "Watch Movie" having a battery consumption of 50%, and a user behavior of "Home" having a battery consumption of 25%; and a last user 9999 is associated with the utilization of a photo editing application having a battery consumption of 6%, an activity of "Edit Photos" having a battery consumption of 10%, and a user behavior of "Work" having a battery consumption of 80%.

In some examples, the lookup table 300 may comprise a list of components, a list of activities, a list of user behaviors, or some combination thereof. As discussed above with respect to FIG. 1, an activity describes an operation that utilizes multiple components. In various examples, a battery consumption of a component may be associated with an activity. In some examples, a battery consumption of the activity may equal a sum of the battery consumption of each component associated with the activity. As discussed above with respect to FIG. 1, a user behavior describes an activity or set of activities the user engages in on a routine basis. In various examples, a battery consumption of an activity may be associated with the user behavior. In some examples, a battery consumption of the user behavior may equal a sum of the battery consumption of each activity associated with the user behavior.

In other examples, the lookup table 300 may comprise a usage pattern for each component, activity, or behavior. As discussed above with respect to FIG. 2, the usage pattern is a battery consumption over multiple time periods. In various examples, a battery consumption of a component, activity, or behavior may be associated with a time period of the usage pattern. As discussed above with respect to FIG. 2, the time period of the usage pattern is a period of time during which a pattern remains substantially constant.

In various examples, the processor 110 may receive an identifier of a user. The processor 110 may compare the identifier to the list of users in the lookup table 300 to determine which user is associated with the identifier. In some examples, if the identifier is not in the list of users, the processor 110 may create a user profile for the identifier. In other examples, the processor may determine the identity of the user based on a schedule, an application accessed, or a network connection utilized, as discussed above with respect to FIG. 1. In various examples, when determining the battery consumption, as discussed above with respect to FIGS. 1 and 2, the processor 110 may utilize the data associated with the user profile in the lookup table 300. In some examples, based on the comparison of the battery consumption to a usage pattern associated with the user, the processor 110 may update the lookup table 300. For example, the processor 110 may determine a new activity of the user and store the new activity and associated information in the lookup table 300. In other examples, the processor 110 may utilize the updated lookup table 300 to determine a component, activity, or behavior that may be adjusted to increase the remaining battery life.

Figure 4:
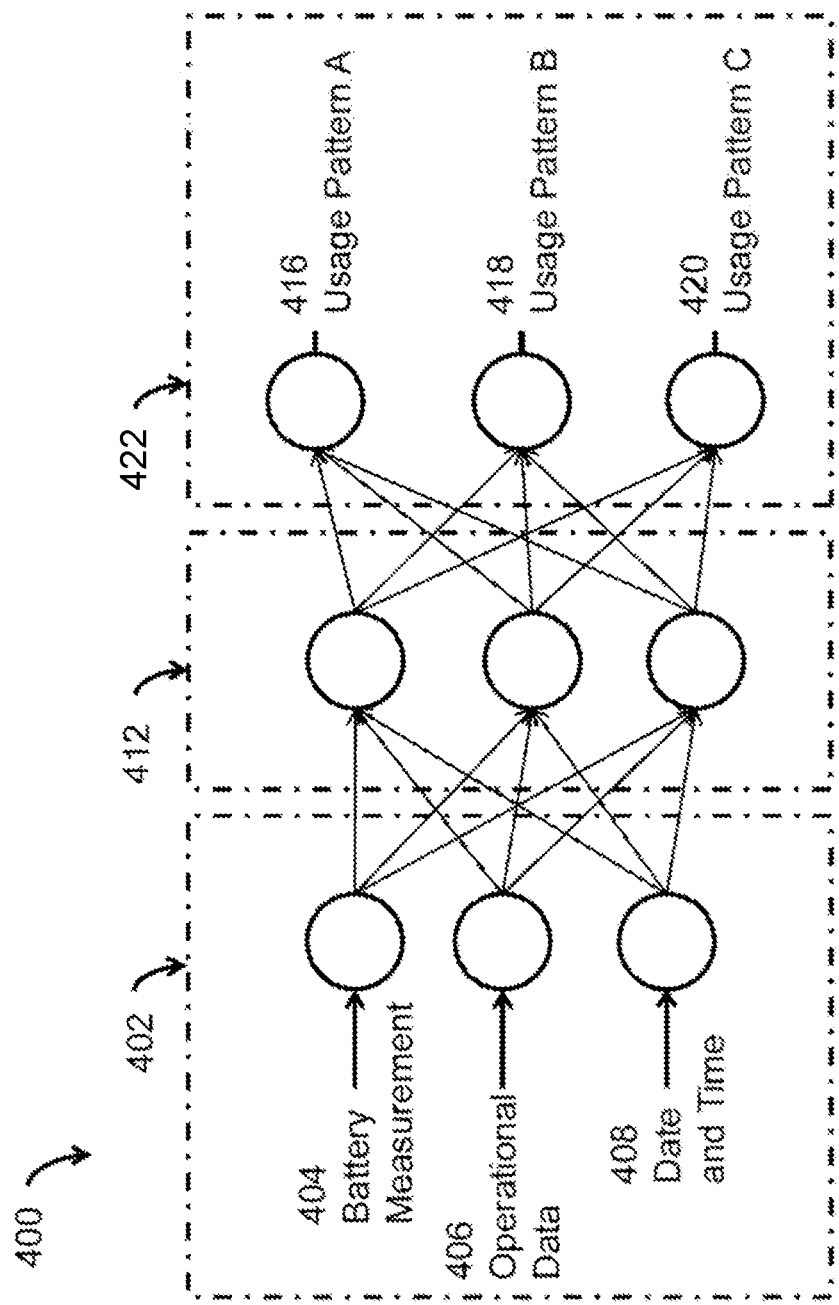
FIG. 4 is a conceptual diagram of a neural network for determining a usage pattern of a user profile, in accordance with various examples.

FIG. 4 is a conceptual diagram of a neural network 400 for determining a usage pattern of a user profile of an electronic device 100, in accordance with various examples. The user profile may be user profile 106, for example. The usage pattern may be the usage pattern 1100, for example. The neural network 400 comprises an input layer 402, a hidden layer 412, and an output layer 422. The input layer 402 may include multiple inputs 404, 406, 408. The multiple inputs 404, 406, 408 may include information about the electronic device 100 (e.g., date and time 408), a battery measurement 404, and operational data 406, for example. The hidden layer 412 may include weighted relationships that describe inputs 404, 406, 408 of the input layer 402. The output layer 422 may include multiple outputs 416, 418, 420. The multiple outputs 416, 418, 420 may include usage patterns of the user profile. For example, a first usage pattern 416, "Usage Pattern A," may indicate a high usage; a second usage pattern 418, "Usage Pattern B," may indicate a regular usage; and a third usage pattern 420, "Usage Pattern C," may indicate a low usage. The usage pattern may be for the battery 102, a component, an activity, or a user behavior, for example.

As discussed above with respect to FIG. 1, in some examples, a usage pattern of the user profile 106 is determined by a neural network with machine-readable instructions that when executed cause the processor 110 to determine the weights that describe the relationships between the inputs 404, 406, 408 of the input layer 402. Values of the weighted relationships are determined by sets of data and may change based on new sets of data. A value of a weighted relationship may be calculated based on one input of the input layer 402 or a selection of inputs of the input layer 402. The number of weighted relationships in the hidden layer 412 is based on a number of inputs of the input layer 402, a number of layers within the hidden layer 412, and a desired number of outputs of the output layer 422. (See below with respect to FIG. 5 for discussion of the hidden layer 412.)

In various examples, the output layer 422 is a usage pattern. The usage pattern may be for a component, activity, behavior, the battery 102, the electronic device 100, or some combination thereof, for example. The processor 110 may utilize the usage pattern to compare to the battery consumption of a component, activity, behavior, the battery 102, or the electronic device 100, as discussed above with respect to FIGS. 1 and 2. The processor 110 may utilize the usage pattern to calculate the remaining battery life, as discussed above with respect to FIGS. 1 and 2. When adjusting battery consumption, the processor 110 may utilize the usage pattern to determine during which time periods a component or components are not utilized, as discussed above with respect to FIG. 2.

Figure 5:
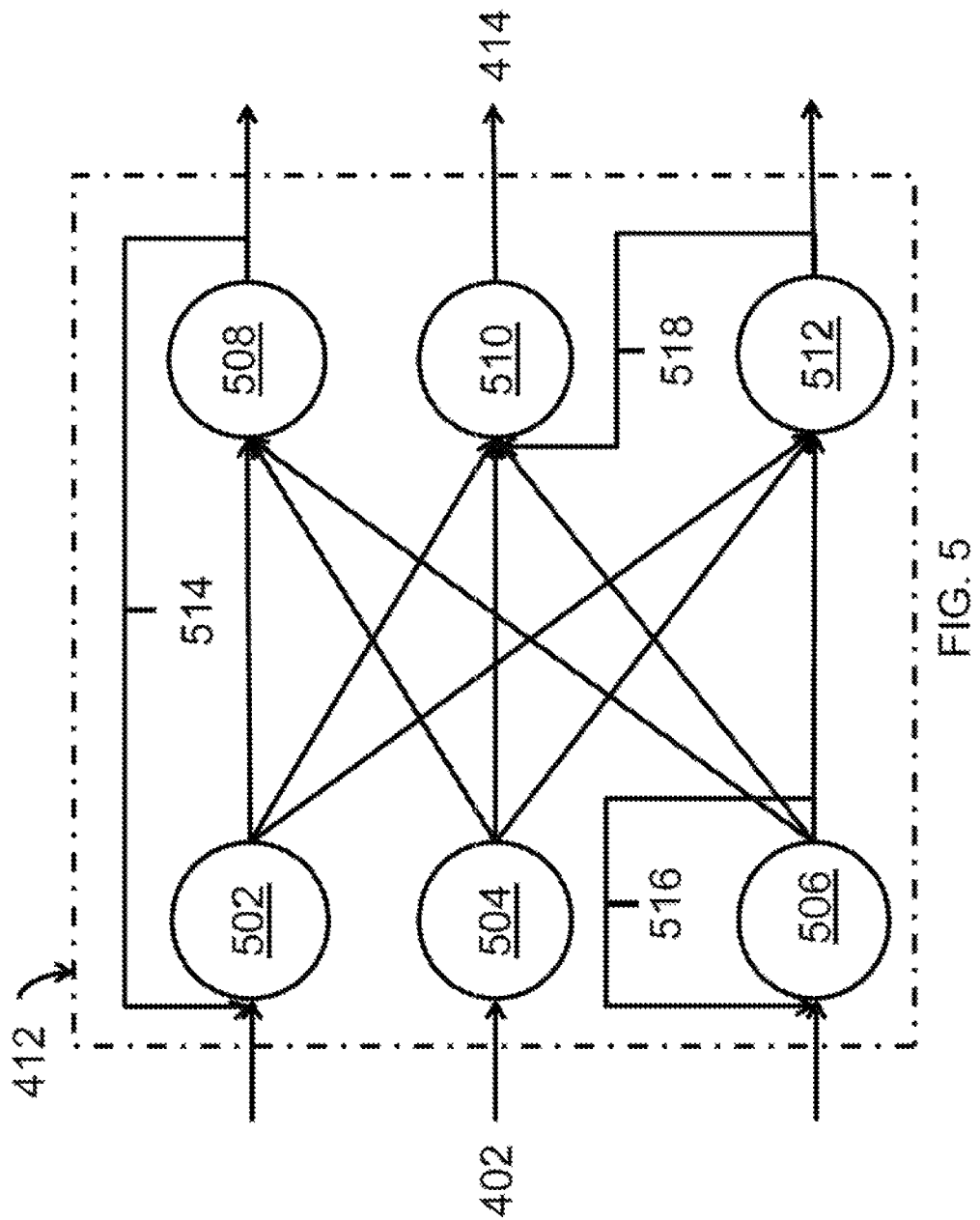
FIG. 5 is a conceptual diagram of a neural network for determining a usage pattern of a user profile, in accordance with various examples.

FIG. 5 is a conceptual diagram of the neural network 400 for determining a usage pattern of a user profile of the electronic device 100, in accordance with various examples. As discussed above with respect to FIG. 4, the neural network 400 comprises the input layer 402, the hidden layer 412, and the output layer 422. The hidden layer 412 may comprise multiple layers. For example, the hidden layer 412 may comprise a first layer that includes weighted relationships 502, 504, 506. The weighted relationships 502, 504, 506 describe the relationships between the inputs of the input layer 402. Outputs of the first layer may become inputs to a second layer that includes weighted relationships 508, 510, 512. A value of a weighted relationship in the second layer may be calculated based on one output of the first layer or a selection of outputs of the first layer. In this manner, the layers of the hidden layer 412 may refine the calculations until the number of outputs desired for the output layer 422 is achieved.

In some examples, outputs of a layer of the hidden layer 412 may be inputs to the same layer or a previous layer of the hidden layer 412. A path 514 inputs the output of the weighted relationship 508 into the weighted relationship 502. A path 516 inputs the output of the weighted relationship 506 into the weighted relationship 506. A path 518 inputs the output of the weighted relationship 512 into the weighted relationship 510. When an output becomes an input for the same layer or a previous layer, the output may be referred to as a backward propagated input. The path 514 carries the output of the weighted relationship 508 as a backward propagated input into the weighted relationship 502 of the previous layer. The path 516 carries the output of the weighted relationship 506 as a backward propagated input into the weighted relationship 506 of the same layer. The path 518 carries the output of the weighted relationship 512 as a backward propagated input into the weighted relationship 510 of the same layer. In various examples, the weighted relationships 502, 504, 506 describe the relationships between the inputs of the input layer 402 as well as any backward propagated inputs of the hidden layer 412. In other examples, the weighted relationships 508, 510, 512 describe the relationships between the outputs of the first layer of the hidden layer 412 as well as any backward propagated inputs of the second layer of the hidden layer 412.

In various examples, the neural network 400 is a Long Short-Term Model (LTSM) (or other time series model). The weighted relationships of the hidden layer 412 may include an input gate, an output gate, or both an input and an output gate. The gates may use inputs to the weighted relationship to determine whether to update the weighted relationship. The gates may use inputs to the weighted relationship to determine whether to access the data associated with the weighted relationship. For example, the input gate may control whether to update the weighted relationship and the output gate may control whether to access the data associated with the weighted relationship. The gates may have associated weights utilized in controlling decisions. For example, if a weight associated with a gate equals zero, then access to the data of the weighted relationship may be denied. In another example, the weighted relationship may not be updated.

In some examples, the LSTM is utilized to predict usage patterns based on simulated inputs. For example, the processor 110 may access the user's calendar to determine future activities or behaviors the user plans. The processor 110 may utilize the LSTM to determine a usage pattern associated with the calendar activity or behavior. The LSTM may utilized data stored in the weighted relationships of the hidden layer 412 to determine the usage pattern as an output of the output layer 422, for example. In various examples, the processor 110 may calculate the battery consumption of the usage pattern. Based on the battery consumption associated with the usage pattern, the processor 110 may prompt a display to show recommended actions for the user, as discussed above with respect to FIG. 3. In other examples, the processor 110 may utilize the usage pattern to determine a component or components that will not be utilized during the predicted activity. The processor 110 may adjust the power supply to the component or components to improve the remaining battery life. By increasing the remaining battery life, the processor 110 may prevent disruption of operations during the predicted activity.

Figure 6:
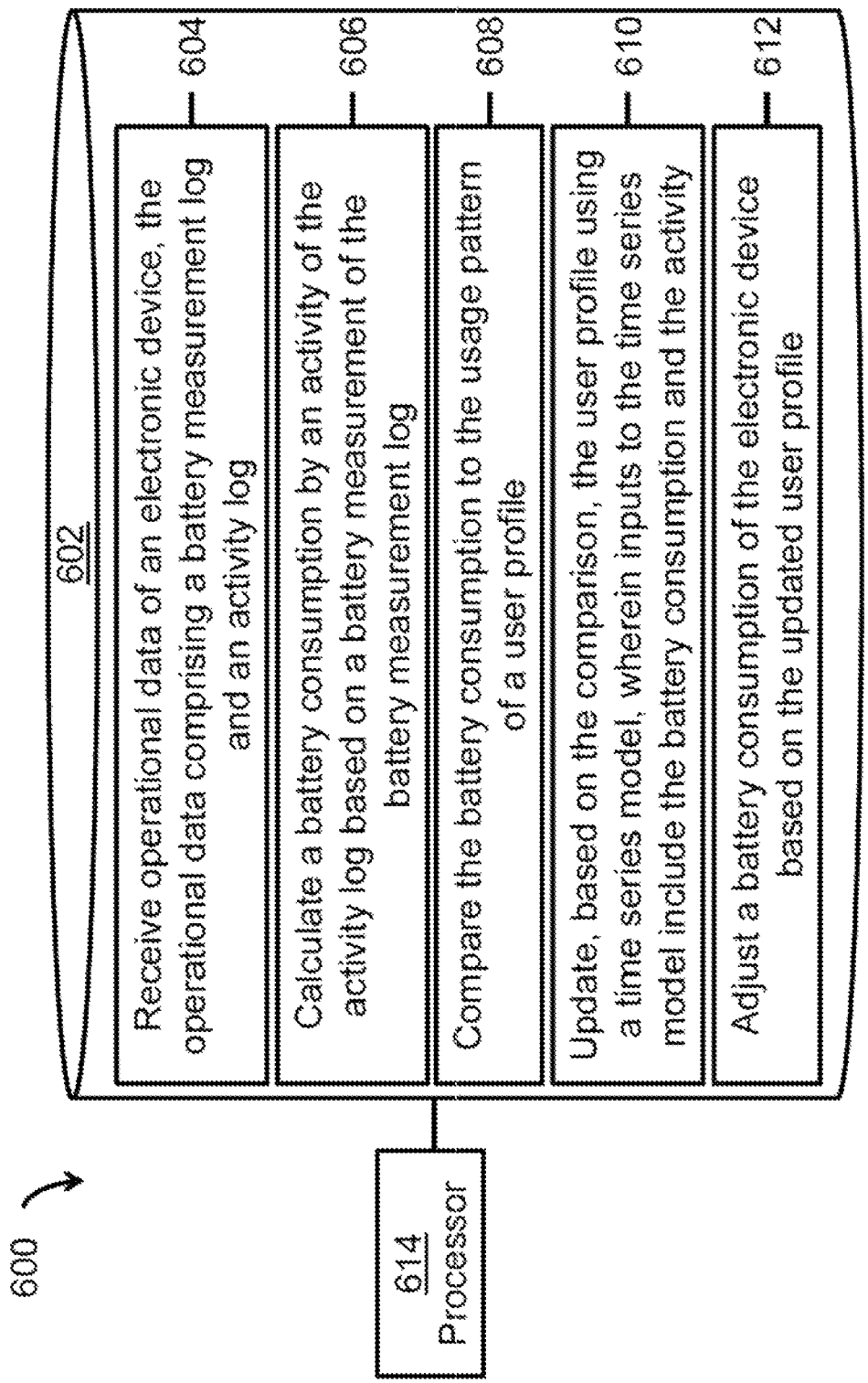
FIG. 6 is a schematic diagram of a system for managing a battery consumption of an electronic device.

FIG. 6 is a schematic diagram of a system 600 for managing a battery consumption of an electronic device. The system 600 comprises a computer-readable medium 602 and a processor 614 coupled to the computer-readable medium 602. The system 600 may be the electronic device 100, for example. The computer-readable medium 602 may be a storage device such as a hard drive, solid state drive (SSD), flash memory, random access memory (RAM), or other suitable memory, for example. The computer-readable medium 602 may be the storage device 104, for example. The processor 614 may be a microprocessor, a microcomputer, a microcontroller, or another suitable controller, for example. The processor 614 may be the processor 110, for example. The computer-readable medium 602 may store machine-readable instructions, which, when executed, cause the processor 614 to perform some or all of the actions attributed herein to the processor 614.

The computer-readable medium 602 comprises machine-readable instructions 604, 606, 608, 610, and 612. The machine-readable instructions 604, 606, 608, 610, 612 may be machine-readable instructions 108, for example. The machine-readable instructions 604, 606, 608, 610, 612 may be machine-readable instructions for execution by the processor 614. Execution of the machine-readable instructions 604, 606, 608, 610, 612 may cause the processor 614 to calculate a battery consumption of an activity, update the user profile based on the battery consumption, and adjust a battery consumption of the electronic device based on the updated user profile. Execution of machine-readable instruction 604 may cause the processor 614 to receive operational data of an electronic device, the operational data comprising a battery measurement log and an activity log. Execution of machine-readable instruction 606 may cause the processor 614 to calculate a battery consumption of an activity of the activity log based on a battery measurement of the battery measurement log. Execution of machine-readable instruction 608 may cause the processor 614 to compare the battery consumption to the usage pattern of a user profile. Execution of machine-readable instruction 610 may cause the processor 614 to update, based on the comparison, the user profile using a time series model, where inputs to the time series model include the battery consumption and the activity. Execution of machine-readable instruction 612 may cause the processor 614 to adjust a battery consumption of the electronic device based on the updated user profile.

The battery measurement log is a time series comprised of battery measurements captured during sequential time periods. The activity log is a time series comprised of activities captured by operational data during sequential time periods. The time periods may be determined by a sampling rate, as discussed above with respect to FIG. 2. In various examples, the processor 110 may determine a time period of an activity and fetch a battery measurement from the same time period to calculate the battery consumption. The processor 110 may calculate the battery consumption, as discussed above with respect to FIGS. 1 and 2. The processor 110 may compare the battery consumption to a usage pattern of a user profile. The user profile may be the user profile 106, for example. The usage pattern may be the usage pattern 1100, for example. Based on the comparison, the processor 110 may update the user profile 106 utilizing the battery consumption and activity as inputs. For example, the battery consumption may be input 404 and the activity may be another input to the input layer 402 of the user profile 400.

Figure 7:
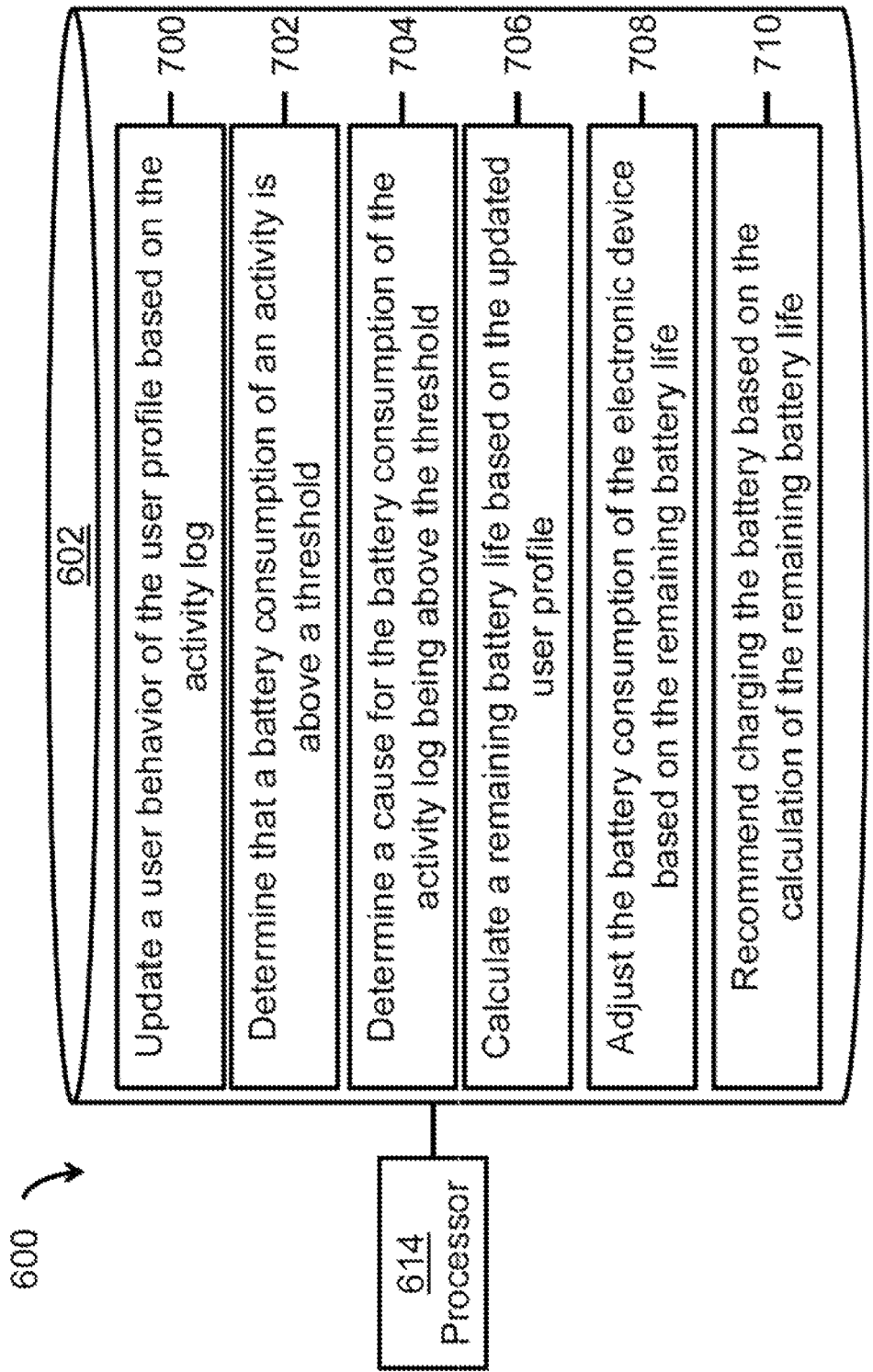
FIG. 7 is a schematic diagram of a system for managing a battery consumption of an electronic device.

FIG. 7 is a schematic diagram of the system 600 for managing a battery consumption of an electronic device. As discussed above with respect to FIG. 6, the system 600 comprises a computer-readable medium 602 and a processor 614 coupled to the computer-readable medium 602. The computer-readable medium 602 comprises machine-readable instructions 700, 702, 704, 706, 708, and 710. The machine-readable instructions 700, 702, 704, 706, 708, 710 may be machine-readable instructions 108, for example. The machine-readable instructions 700, 702, 704, 706, 708, 710 may be machine-readable instructions for execution by the processor 614. Execution of the machine-readable instructions 700, 702, 704, 706, 708, 710 may cause the processor 614 to calculate a battery consumption for an activity of an activity log, determine a cause for the battery consumption of the activity being above a threshold, and adjusting the battery consumption of the electronic device based on the remaining battery life.

Execution of machine-readable instruction 700 may cause the processor 614 to update a user behavior of the user profile based on the activity log. Execution of machine-readable instruction 702 may cause the processor 614 to determine that a battery consumption of an activity is above a threshold. Execution of machine-readable instruction 704 may cause the processor 614 to determine a cause for the battery consumption of the activity log being above the threshold. Execution of machine-readable instruction 706 may cause the processor 614 to calculate a remaining battery life based on the updated user profile. Execution of machine-readable instruction 708 may cause the processor 614 to adjust the battery consumption of the electronic device based on the remaining battery life. Execution of machine-readable instruction 710 may cause the processor 614 to recommend charging the battery based on the calculation of the remaining battery life.

As discussed above with respect to FIG. 1, a user behavior describes an activity or a set of activities the user engages in on a routine basis. In some examples, the processor 614 may determine that the user behavior comprises an activity of the activity log. The processor 614 may update a usage pattern associated with the user behavior with battery measurements and operational data associated with the activity, for example. The usage pattern may be the usage pattern 1100, for example. In another example, the processor 614 may determine the activity log defines a new user behavior. The processor 614 may create a new behavior in the user profile based on the activity log. The user profile may be the user profile 106, for example. As discussed above, the processor 614 may calculate a remaining battery life of the updated user profile and adjust the battery consumption of the electronic device based on the remaining battery life. The processor 614 may cause a display to show a recommendation to the user to charge the battery based on the remaining battery life, as discussed above with respect to FIG. 2.

In various examples, the processor 614 may determine that a battery consumption of an activity is above a threshold. For example, the processor 614 may compare the battery consumption to a usage pattern of the activity to determine the battery consumption is above the threshold. As discussed above, an activity describes an operation of the electronic device 100 that utilizes multiple components. In an example, the processor 614 may compare a most recent battery measurement for a component to a usage pattern of the component to determine if the component is consuming more energy than indicated by the usage pattern. The processor 614 may perform a comparison for all components involved in the activity. In some examples, the processor 614 may cause a sampling rate associated with operational data of the component to increase to monitor performance of the component or components associated with the activity. In other examples, based on the comparison of the battery measurement of the component to the usage pattern of the component, the processor 614 may cause a display to show a recommendation that the user take corrective action. In yet other examples, the processor 614 may calculate a remaining battery life based on the increased battery consumption. The processor 614 may cause a display to show a warning to the user that the unusual activity may cause the battery to dissipate faster and provide the remaining battery life, for example.

Figure 8:
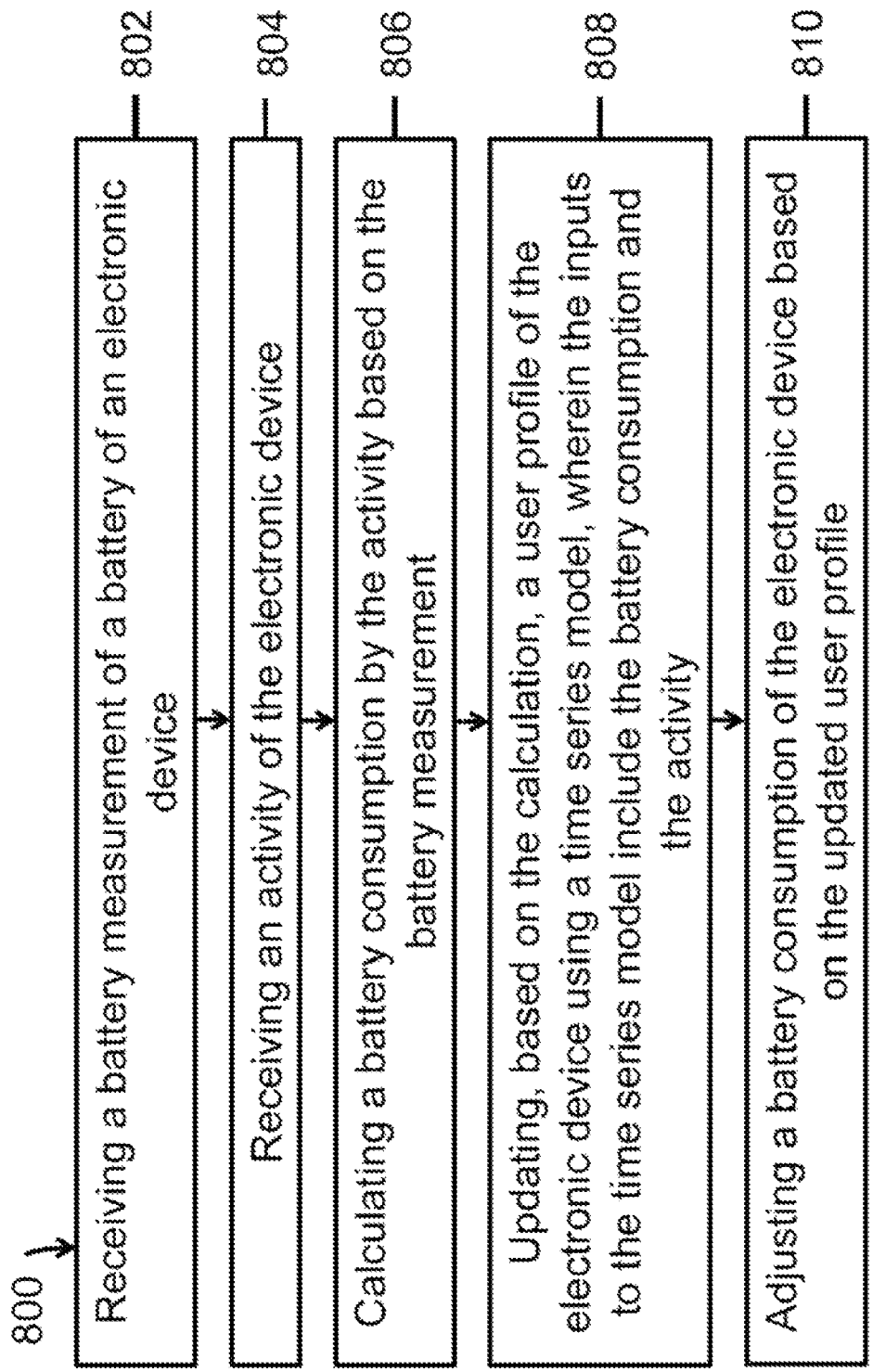
FIG. 8 is a flow diagram of a method for managing a battery consumption of an electronic device.

FIG. 8 is a flow diagram of a method 800 for managing a battery consumption of an electronic device, in accordance with various examples. The method 800 may be performed, for example, by the processor 110, 614. The electronic device may be the electronic device 100, for example. The method 800 includes receiving a battery measurement of a battery of an electronic device (802). The method 800 also includes receiving an activity of the electronic device (804). In addition, the method 800 includes calculating a battery consumption of the activity based on the battery measurement (806). Additionally, the method 800 includes updating, based on the calculation, a user profile of the electronic device using a time series model, wherein the inputs to the time series model include the battery consumption and the activity (808). The method 800 also includes adjusting a battery consumption of the electronic device based on the updated user profile (810).

As discussed above with respect to FIG. 1, inputs to a user profile may include any data that affects a usage pattern of the user profile. The user profile may be the user profile 106, for example. The usage pattern may be the usage pattern 1100, for example. As discussed above with respect to FIG. 2, in some examples, inputs to the time series model may include the battery measurement and the operational data. The battery consumption is calculated from the battery measurement, and the activity is determined from the operational data. In various examples, the battery consumption and the activity may also be inputs to the time series model. The battery consumption and the activity may be inputs additional to the battery measurement and operational data inputs, for example. In another example, the battery consumption and the activity may be the sole inputs into the time series model.

Figure 9:
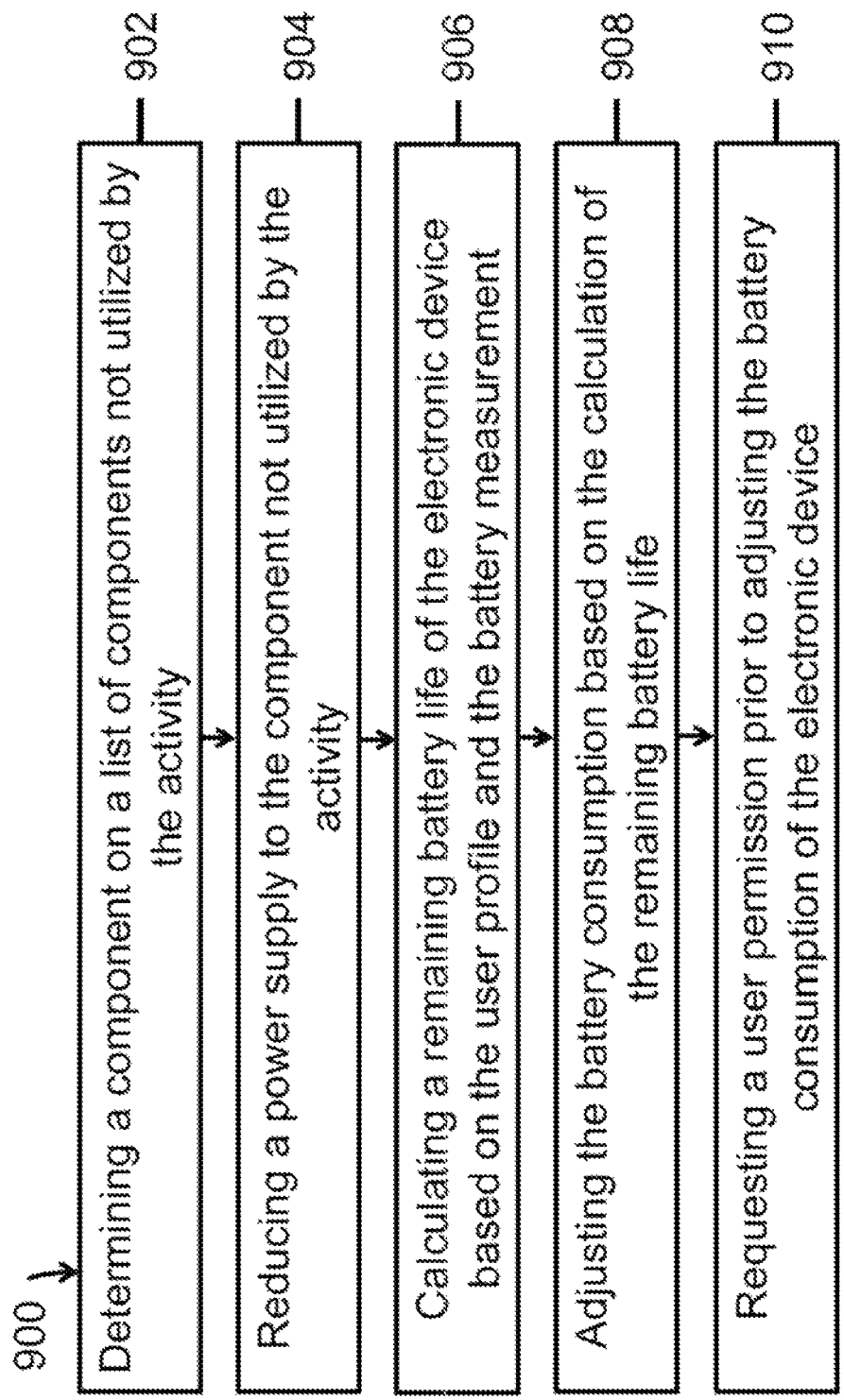
FIG. 9 is a flow diagram of a method for managing a battery consumption of an electronic device, in accordance with various examples.

FIG. 9 is a flow diagram of a method 900 for managing a battery consumption of an electronic device, in accordance with various examples. The method 900 may be performed, for example, by the processor 110, 614. The electronic device may be the electronic device 100, for example. The method 900 includes determining a component on a list of components not utilized by the activity (902). The method 900 also includes reducing a power supply to the component not utilized by the activity (904). In addition, the method includes calculating a remaining battery life of the electronic device based on the user profile and the battery measurement (906). Additionally, the method 900 includes adjusting the battery consumption based on the calculation of the remaining battery life (908). The method 900 also includes requesting a user permission prior to adjusting the battery consumption of the electronic device (910).

As discussed above, the processor may determine a component not utilized by an activity. The processor may cause a power supply to the component not utilized to be adjusted. After the adjustment, the processor may calculate a remaining battery life based on the user profile and the battery measurement. The user profile may be the user profile 106, for example. The processor may determine a second adjustment based on the remaining battery life. As discussed above, the processor may cause a display to show the user a request for permission for the processor to perform the second adjustment.

Figure 10:
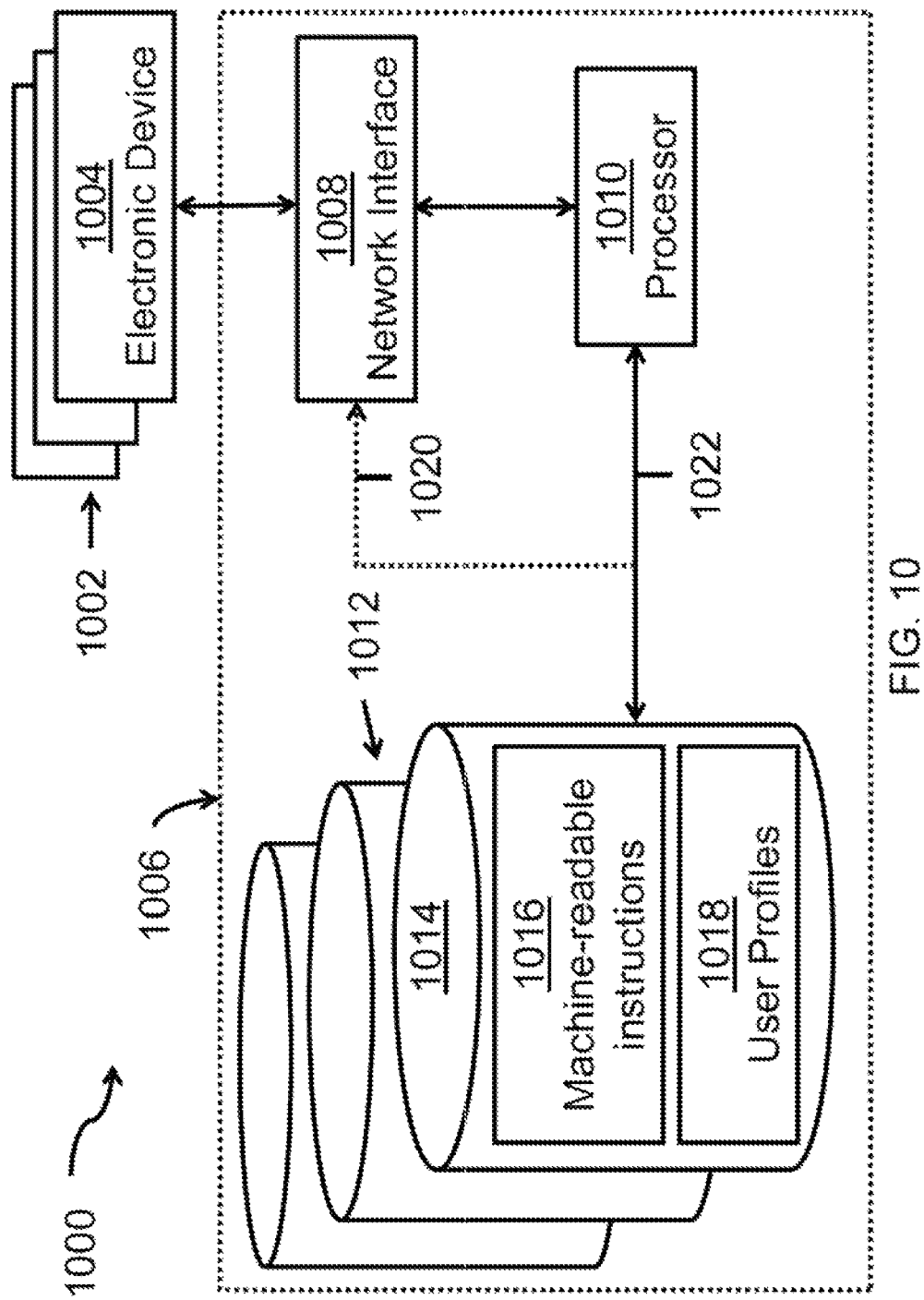
FIG. 10 is a schematic diagram of a system for managing a battery consumption of an electronic device.

FIG. 10 depicts a schematic diagram of a system 1000, in accordance with various examples. The system 1000 comprises electronic devices 1002 and a processing environment 1006 coupled to the electronic devices 1002. An electronic device 1004 of the electronic devices 1002 may be a laptop, notebook, tablet, smartphone, mobile device, or some other device having a battery, for example. The electronic device 1004 may be the electronic device 100, for example. The processing environment 1006 may be an electronic device (e.g., server, central server, edge server, or some other suitable computing device) or a network of electronic devices (e.g., local area network (LAN), wide area network (WAN), virtual private network (VPN), client/server network, Internet (e.g., cloud), or any other suitable system for sharing processing and memory resources).

The processing environment 1006 comprises a network interface 1008, a processor 1010 coupled to the network interface 1008, and storage devices 1012. The processor 1010 may be a microprocessor, a microcomputer, a microcontroller, or other suitable processor or controller, for example. In some examples, such as when the storage devices 1012 are remotely managed storage devices (e.g., enterprise cloud, public cloud, data center, server, or some other suitable storage device), the processor 1010 may be communicatively coupled to the storage devices 1012 via a path 1020 coupling the network interface 1008 and the storage devices 1012. In other examples, such as when the processor 1010 and the storage devices 1012 are located on a computing device, the storage devices 1012 may be coupled via a path 1022 to the processor 1010. A storage device 1014 of the storage devices 1012 may be a hard drive, solid state drive (SSD), flash memory, random access memory (RAM), or other suitable memory, for example. The storage device 1014 may store machine-readable instructions 1016, which, when executed, cause the processor 1010 to perform some or all of the actions attributed herein to the processor 1010. The machine-readable instructions 1016 may be the machine-readable instructions 108, for example.

In various examples, the electronic device 1004 may have an identifier, while another electronic device of the electronic devices 1002 may have another identifier. In some examples, the electronic device 1004 may utilize one operating system (e.g., WINDOWS®, ANDROID®, MAC OS®), while another electronic device of the electronic devices 1002 may utilize another operating system. In other examples, the electronic device 1004 may belong to one enterprise, while another electronic device of the electronic devices 1002 may belong to another enterprise. In some examples, the electronic devices 1002 are owned by one enterprise.

In some examples, the electronic devices 1002 and the system 1000 belong to the same enterprise. In other examples, an enterprise owning an application installed on the electronic devices 1002 is also the enterprise owning the system 1000. In various examples, an enterprise to which the electronic devices 1002 belong has granted an enterprise owning the processing environment 1006 access rights to the electronic devices 1002. In other examples, an enterprise owning the processing environment 1006 has granted an enterprise, to which the electronic devices 1002 belong, access rights to the storage devices 1014. The enterprise to which the electronic devices 1002 belong may grant the enterprise owning the processing environment 1006 access rights to data of the electronic devices 1002 stored on the storage devices 1014. For example, the enterprise to which the electronic devices 1002 belong may have the ability to upload data for storage on the storage devices 1014. The processing environment 1006 may then access the data to identify data of interest (e.g., operational data, user profile) and analyze the data to determine an adjustment of a battery of an electronic device 1004 associated with the data. In some examples, the processing environment 1006, having been granted previous access rights, may access the data automatically on a scheduled basis (e.g., hourly, daily, weekly, monthly).

In various examples, the electronic device 1004 comprises a user profile and collects battery measurements and operational data. The electronic device 1004 may store the user profile, battery measurements, and operational data on the electronic device 1004, for example. In some examples, the electronic device 1004 may transmit the user profile, battery measurements, and operational data when the processor 1010 transmits a request for the information. In other examples, the electronic device 1004 may have permission to store the user profile, battery measurements, and operational data or on the storage device 1014. In various examples, the processor 1010 may have permission to access the data on the storage device 104.

In some examples, the processor 1010 may calculate a battery consumption by a first component of the electronic device 1004 based on a battery measurement. In other examples, the processor 1010 may compare the battery consumption to a usage pattern of the user profile of the electronic device 1004. In various examples, the processor 1010 may have permission to update, based on the comparison, the user profile of the electronic device 1004. In yet other examples, the processor 1010 may have permission to adjust a battery consumption of the electronic device 1004 based on the updated user profile. In various examples, the processor 1010 may transmit a recommendation to adjust a battery consumption the electronic device 1004. The recommendation may include a component, an activity, a user behavior, or a combination thereof.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the above discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

What is claimed is:

1. An electronic device, comprising:
   a battery;
   a storage device storing a user profile, the user profile comprising a usage pattern of the battery; and
   a processor coupled to the battery and the storage device, the processor to:
   receive a battery measurement of the battery and operational data of a first component of the electronic device;
   calculate a battery consumption of the first component based on the battery measurement;
   compare the battery consumption to the usage pattern;
   update, based on the comparison, the user profile using a time series model, wherein inputs to the time series model include the battery measurement and the operational data; and
   adjust a battery consumption of the electronic device based on the updated user profile.

2. The electronic device of claim 1, wherein the user profile comprises a user behavior, a usage pattern of the battery for the user behavior, a list of components of the electronic device, a usage pattern of the battery for a component of the list of components, or a combination thereof.

3. The electronic device of claim 2, wherein the usage pattern of the battery for a user behavior comprises a battery consumption for the user behavior.

4. The electronic device of claim 2, wherein the usage pattern of the battery for the component of the list of components comprises a battery consumption for the component.

5. The electronic device of claim 1, wherein the battery measurement comprises a maximum charge capacity, a state of charge, a maximum voltage, a voltage state, a consumption rate, an error status, or a combination thereof.

6. A non-transitory computer-readable medium to store machine-readable instructions which, when executed by a processor of an electronic device, cause the processor to:

receive operational data of an electronic device, the operational data comprising a battery measurement log and an activity log;
calculate a battery consumption of an activity of the activity log based on a battery measurement of the battery measurement log;
compare the battery consumption to a usage pattern of a user profile:
update, based on the comparison, the user profile using a time series model, wherein inputs to the time series model include the battery consumption and the activity; and
adjust a battery consumption of the electronic device based on the updated user profile.

7. The computer-readable medium of claim 6, wherein the machine-readable instructions cause the processor to update a user behavior of the user profile based on the activity log.

8. The computer-readable medium of claim 6, wherein the machine-readable instructions cause the processor to:
determine that the battery consumption of the activity is above a threshold; and
determine a cause for the battery consumption of the activity being above the threshold.

9. The computer-readable medium of claim 6, wherein the machine-readable instructions cause the processor to:
calculate a remaining battery life based on the updated user profile; and
adjust the battery consumption of the electronic device based on the remaining battery life.

10. The computer-readable medium of claim 9, wherein the machine-readable instructions cause the processor to recommend charging the battery based on the calculation of the remaining battery life.

11. A method, comprising:
receiving a battery measurement of a battery of an electronic device;
receiving an activity of the electronic device;
calculating a battery consumption of the activity based on the battery measurement;
updating, based on the calculation, a user profile of the electronic device using a time series model, wherein inputs to the time series model include the battery consumption and the activity; and
adjusting a battery consumption of the electronic device based on the updated user profile.

12. The method of claim 11, wherein the user profile comprises the activity, a battery consumption of the activity, a user behavior, a battery consumption of the user behavior, a list of components of the electronic device, a battery consumption for a component of the list of components of the electronic device, or a combination thereof.

13. The method of claim 12, comprising adjusting the battery consumption of the electronic device based on the user profile by:
determining a component on the list of components not utilized by the activity; and
reducing a power supply to the component not utilized by the activity.

14. The method of claim 11, comprising adjusting the battery consumption of the electronic device based on the user profile by:
calculating a remaining battery life of the electronic device based on the user profile and the battery measurement; and
adjusting the battery consumption based on the calculation of the remaining battery life.

15. The method of claim 11, comprising requesting a user permission prior to adjusting the battery consumption of the electronic device.

* * * * *